Figure 1:
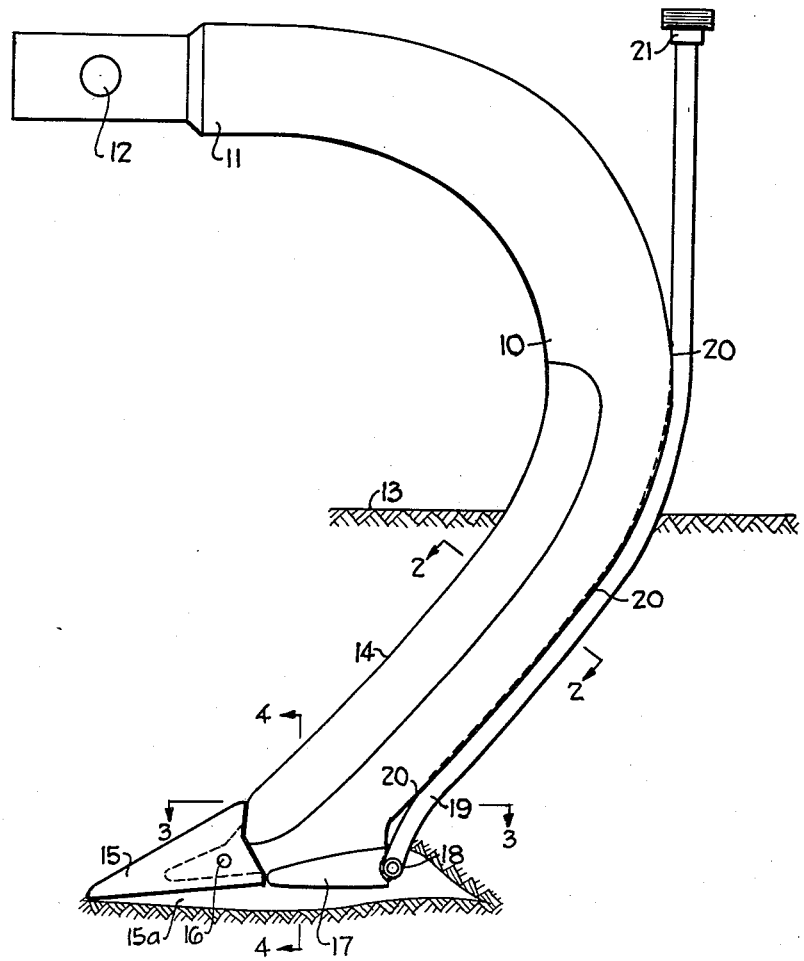

May 27, 1952 L. S. HANNIBAL 2,598,121
SOIL INJECTOR
Filed June 21, 1948 2 SHEETS—SHEET 1

Inventor:
Lester S. Hannibal
By Oswald H. Wilmore
his Attorney

May 27, 1952 L. S. HANNIBAL 2,598,121
SOIL INJECTOR
Filed June 21, 1948 2 SHEETS—SHEET 2

Inventor:
Lester S. Hannibal
By Oswald R. Milmore
his Attorney

Patented May 27, 1952

2,598,121

UNITED STATES PATENT OFFICE 2,598,121

SOIL INJECTOR

Lester S. Hannibal, Concord, Calif., assignor to Shell Development Company, San Francisco, Calif., a corporation of Delaware Application June 21, 1948, Serial No. 34,183

10 Claims. (Cl. 111—7)

This invention relates to the treatment of soil by introducing a fluid into the soil under the surface thereof, whereby benefit may be derived from such fluid, e. g., fertilization, the killing of undesirable organisms, such as nematodes, stimulation or retardation of growth, etc. While the invention may be applied to the injection of any fluid, e. g., a liquid, a dispersion of a gas and liquid, an emulsion, and a gas, it is particularly efficacious for the injection at superatmospheric pressure of volatile liquids, or gases which have tendency to escape from the soil. The invention will be described with particular reference to the injection of substantially anhydrous ammonia into the ground under superatmospheric pressure; no claim is, however, made herein for invention in the use of any specific treating fluid, and it will be readily observed that the invention may also be applied to the treatment of soils with other treating materials, such as air, nitrogen, sulfur-dioxide, hydrogen cyanide and similar fumigants, and liquids, such as aqueous ammonia.

It is already known to introduce fluids, viz., volatile liquids or gases such as gaseous or liquid ammonia or a mixture of gaseous and liquid ammonia into the ground by means of a cultivator chisel or similar agricultural implement, the point of which is moved through the ground some distance beneath the ground level, and which has a duct through its shank or a tube associated therewith for conducting the fluid from a suitable source on a vehicle carrying the implement downwardly to a point beneath the ground from which the fluid may be discharged continuously as the implement is pulled parallel to the ground. (See U. S. patent to Leavitt, No. 2,306,339.) A difficulty encountered in such operations has been that comparatively poor penetration and absorption of the fluid into the soil is often achieved, with the undesirable consequence that a part of the fluid escapes through the more or less vertical furrow made by the shank of the cultivator chisel. This condition is aggravated when a heavy, moist soil is worked on, causing a comparatively smooth walled furrow to be cut and thus providing only a limited surface on the soil at which the treating fluid can be absorbed. This difficulty is further encountered in high speed operations in which the cultivator chisel may move as fast as 500 feet per minute, and correspondingly greater rates of fluid discharge are utilized; in such cases it was found that the soil does not come together rapidly enough to seal the furrow before an appreciable part of the fluid has escaped.

Difficulty has, moreover, been experienced at times in the injection of volatile liquids into moist soil by the chilling of the injector blades to temperatures at which soil moisture is frozen. This causes lumps of ice and hardened mud to accumulate on the blade, creating excessive drag.

It is an object of this invention to provide an improved method and apparatus for introducing fluids into the soil under the surface thereof wherein a more effective penetration of the soil is achieved.

Another important object is to provide an improved method and apparatus for injecting a volatile fluid, such as a volatile liquid or gas, or mixture of gas and liquid, into soil under the surface thereof wherein the losses due to escape of the volatile fluid from the soil is minimized.

A subsidiary object is to provide an injection blade wherein the conduit for supplying a volatile liquid is so mounted as to overcome the icing of soil moisture on the blade due to chilling of the injector blade caused by vaporization of a volatile liquid being flowed downwardly for injection into the ground.

A further object is to provide an improved injection blade for injecting fluids into soil having a heel piece behind the spear point, the heel piece extending laterally beyond the sides of the supporting shank and having an appreciable vertical depth as to form a horizontal fissure in the soil when the blade is moved through the soil, the heel piece being provided with ducts for ejecting the fluid laterally into the said fissure.

A specific object is to provide an improved method for treating soil with ammonia under pressure by injecting ammonia, either in the liquid or gaseous state, laterally into a horizontal fissure beneath the ground surface.

Briefly, according to the instant invention, the fluid is injected laterally, either unilaterally or ambilaterally, into one or more lateral fissures formed progressively and entirely beneath the surface of the ground near the point of injection, such a point of injection being continuously moved. The fissure usually extends substantially horizontally toward the sides of the path described by the injection point, but the use of horizontal fissures is not always necessary. The method is most advantageously carried out by employing the novel injection blade according to the invention, which comprises a shank adapted to be moved through the ground from a suitable support above the ground having an integral or replaceable spear point at its lower, forward end, and a heel in rear of the point, said heel extending laterally beyond the sides of the shank and, preferably, also beyond the sides of the spear point, and having an appreciable depth (i. e., vertical dimension) or angle to lift the soil sufficiently to form a more or less instantaneous lateral fissue in the soil. The heel is further provided with means for discharging the fluid laterally into the fissure.

Figure 2:
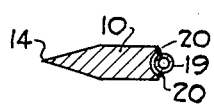
Figure 3:
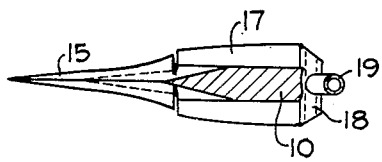
Figure 4:
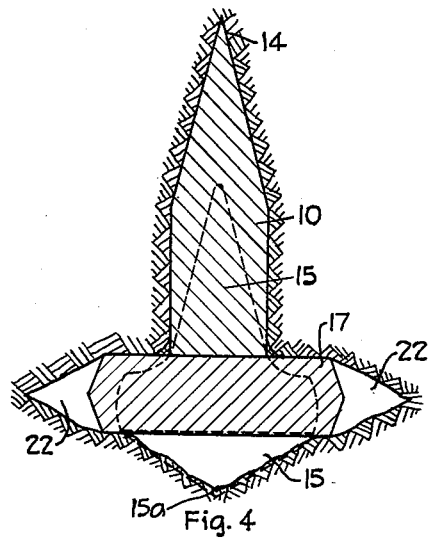
Figure 5:
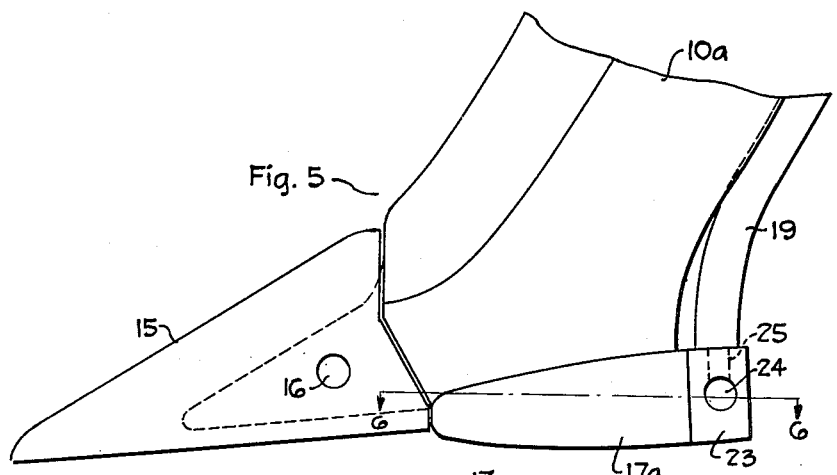
Figure 6:
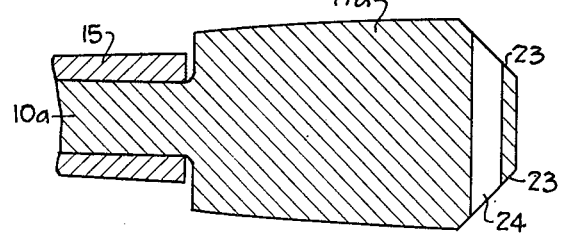

The invention will be better understood from the following detailed description of certain specific, preferred embodiments, taken in connection with the accompanying drawing forming a part of this specification, wherein:

Figure 1 is a side elevation view of an injection blade constructed according to the invention;

Figures 2, 3 and 4 are sectional views taken on lines 2—2, 3—3, and 4—4, respectively, of Figure 1, Figure 4 being on an enlarged scale;

Figure 5 is a fragmentary side elevation of the lower portion of a modified form; and Figure 6 is a sectional view taken on line 6—6 of Figure 5.

Referring to Figures 1 to 4 in detail, the injector blade comprises a shank 10, having a horizontal portion 11 of rectangular cross-section at the top provided with a hole 12 for attachment to the tool bar of a cultivator or any suitable vehicle of the type commonly used for agricultural purposes (not shown), such vehicle being provided with well known means for raising or lowering the tool bar and maintaining it at a desired elevation with respect to the surface of the ground 13. The curved, downwardly extending portion of the blade at the section shown in Figure 2 has a sharp leading edge 14. A replaceable spear point 15 of hardened metal, in the form of a shoe, is secured to the lower, forward tip of the shank by means of a pin or bolt 16 extending through a horizontal hole in the toe of the blade. The parts described thus far are similar to those used in conventional cultivator chisels.

A heel piece 17 is welded to the bottom of the shank in rear of the spear point. It extends ambilaterally beyond the sides of the shank 10 and of the spear point 15 and increases in depth from the front to the rear to provide a pair of lateral projections or wings. The bottom of the heel piece is, preferably, higher than the bottom of the spear point 15. The forward edge is preferably rounded, as shown in Figure 1, although a thin leading edge may be used. A horizontal tube 18 having its ends bevelled inwardly toward the rear in order to prevent soil obstruction is welded to the rear of the heel piece. It has a hole cut in its upper wall intermediate to the ends affording communication with a supply pipe 19 welded at intervals to the rear of the shank 10 and at its end to the tube 18. While the transverse tube 18 and pipe 19, may in certain cases, particularly when dry soils are to be treated, and/or when a non-vaporizing fluid, such as gas or a liquid of low volatility, is to be injected, be in direct contact with the heel piece and shank, it is preferred to space them from their supports by providing grooves in the rear faces of the heel 17 and shank 10, as shown, and building up the welding metal at intervals as indicated at 20. By this arrangement an air gap is provided and the shank and heel are partially heat-insulated from the pipe and tube, and are not greatly chilled by the vaporization of liquid in the pipe and tube. This minimizes the freezing of moisture from the ground on the injection blade. A fitting 21 at the top of the pipe 19 is adapted to be attached to a supply hose, not shown, for supplying treating fluid to the injector.

In practicing the method and using the improved injector blade, the latter is pulled through the ground by an agricultural vehicle, as is well understood in the art, at any desired speed, e. g., 300 feet per minute, while maintaining the spear point 15 and heel piece 17 at the desired distance beneath the level of the ground, e. g., 6 to 8 inches. The fluid to be injected is forced under the pressure and at a metered rate into the pipe 19. In moving through the ground the spear point opens and raises the soil slightly to form a narrow, tunnel-like fissure 15a. The point is followed by the wings of the heel piece 17 which extend laterally beyond the vertical furrow cut by the edge 14 and the shank 10. The wings, by virtue of being suspended from the shank 10 from the tool bar of the supporting vehicle, raise or lift the soil above them, thereby progressively forming a pair of second, horizontal fissures 22, extending some distance laterally from the heel piece, and well beyond the sides of the shank 10, thereby affording sufficient absorption area to absorb the fluid. The fluid is injected laterally from the ends of the tube 18 into the fissures 22, which again close vertically on both sides of the shank due to the weight of the soil after the blade has passed. The vertical furrow formed by the shank closes by rolling and/or crumbling of the soil after passage of the blade before the vaporized fluid injected into the second fissures can escape as described more particularly below.

It should be noted that, in the preferred arrangement described herein, the bottom of the heel piece does not ride on the bottom of the first, tunnel-like fissure formed by the spear point, and hence does not compress the bottom of the soil, but only lifts the soil, being supported by the vehicle on the surface of the ground. Thus the shank, with the assistance of the wings, provides a lift of several inches within the area of the shank. The invention is, of course, not restricted to embodiments in which the bottom of the heel piece or of the wings is spaced above the bottom of the fissure. Such preferred arrangement is, however, distinctly advantageous, in that the spear point and heel point are thereby made to provide suction into the ground.

In wet soil having considerable cohesion the fissures have more or less smooth surfaces, and the wet soil closes the fissures after passage of the blade with a rotary or rolling motion, so that the sides of the vertical furrow or slot come together near the bottom of the furrow before the lateral fissures close. The lateral fissures are, therefore, sealed against escape from the top before they close completely. Farther up, near the soil surface the furrow is closed mainly by crumbling of the soil. Dry soil or well-worked soil does not close with the rolling motion described above but shatters and crumbles, giving a very large void space between particles for absorption of the volatile fluid. The high affinity of dry soil for most treating agents, particularly ammonia, prevents gas from escaping even though the vertical furrow is not sealed.

In a typical application, anhydrous ammonia, predominantly in the liquid state but containing some ammonia vapors, is introduced at the top of the pipe 19. Additional vaporization takes place during flow through the pipe, so that a mixture of liquid and vaporized ammonia, or only ammonia vapor, is injected from the tube 18.

Maximum ammonia flow is often as high as half a cubic foot of gas (measured at standard conditions) per linear foot of travel, although ¼ and ⅓ cu. ft. per linear ft. are normal.

As previously stated, spear point and/or the heel may be made integral with the shank. Such a form is shown in Figures 5 and 6, wherein the shank 10a has a heel 17a cast integrally therewith, and is fitted with a spear point 15, as in the previous embodiment. The heel has rearwardly tapered side portions 23 at its rear. A transverse bore 24 in the heel 17a has its ends in the portions 23 and is provided with a vertical communicating passageway 25 in communication with the supply pipe 19 which is welded to the heel. By tapering the side walls of the heel at the rear the openings of the bore 24 are kept free from soil obstruction. The modified injector blade is used in the manner previously described.

I claim as my invention:

1. An injector for injecting a treating fluid into soil beneath the surface thereof comprising: a thin supporting shank disposed in a vertical plane and adapted to penetrate said soil and to be moved through the soil; an enlarged body at the lower end of said shank adapted for generally horizontal movement beneath said surface having a point at the front thereof and widening gradually toward the rear to extend laterally beyond at least one side of the shank, said body having an upper surface located laterally beyond the said one side of the shank and sloping upwardly toward the rear; first duct means for supplying treating fluid downwardly from the top of the shank to said body; and second duct means on said body communicating with said first duct means having at least one discharge opening located near the rear of the body at a level above that of the point and below the highest part of said upper surface, said discharge opening being directed to the said one side for discharging said fluid laterally into the soil.

2. The injector according to claim 1 wherein the second duct means comprises a horizontal tube fixed to the rear of said body transversely with respect thereto, the end of the tube toward said one side being terminated short so as not to extend beyond the side of the body and being open to form said discharge opening.

3. The injectors according to claim 2 wherein the said tube has the said open end thereof bevelled with the front part of the tube longer than the rear part of the tube.

4. The injector according to claim 1 wherein the body has a side wall sloping rearwardly and inwardly away from the said side and the second duct means comprises an open horizontal bore within said body intersecting the said side wall.

5. An injector for injecting a treating fluid into soil beneath the surface thereof comprising: a thin supporting shank disposed in a vertical plane and adapted to penetrate said soil and to be moved through the soil; an enlarged body at the lower end of said shank adapted for generally horizontal movement beneath said surface having a point at the front thereof and widening gradually toward the rear to a widest part that extends laterally beyond both sides of the shank, said body having upper and lower surfaces both of which slope upwardly toward the rear, the slope of the upper surface being greater than that of the lower surface; first duct means for supplying treating fluid downwardly from the top of the shank to said body; and second duct means on said body in communication with said first duct means having discharge openings in rear of the said widest part of the body at a level intermediate to said upper and lower surfaces, said discharge openings being directed to the sides of the body for discharging said fluid ambilaterally into the soil, at least the rearward portions of said second duct means at said openings being terminated so as not to extend laterally beyond said widest part of the body.

6. An injector for injecting a treating fluid into soil beneath the surface thereof comprising: a thin shank disposed in a vertical plane and adapted to penetrate said soil and to be moved through the soil along a path of travel in the longitudinal vertical plane of the shank; an enlarged body at the lower end of said shank having a point and widening gradually toward the rear, the rear part of said body extending laterally beyond at least one side of the shank and having an upper surface that slopes upwardly toward the rear to a level above that of the point to raise soil and thereby form a lateral fissure in the soil entirely beneath said surface when the shank is moved through the soil along said path of travel; and duct means for supplying treating fluid from the top of the shank to said body having a discharge opening located at the rear of the body at the level thereof and directed toward said one side substantially perpendicularly to said vertical longitudinal plane for discharging said treating fluid into said fissure.

7. An injector for injecting a treating fluid into soil beneath the surface thereof comprising: a thin shank disposed in a vertical plane and adapted to penetrate said soil and to be moved through the soil along a path of travel in the longitudinal vertical plane of the shank; an enlarged body at the lower end of said shank having a forward tip and a heel in rear thereof, said tip having a point and widening gradually toward the rear and the upper surface thereof sloping upwardly toward the rear, said heel extending laterally beyond said sides of the shank and having upper surfaces that slope upwardly toward the rear to a level above that of the point to raise soil and thereby form lateral fissures in the soil entirely beneath said surface when the shank is moved through the soil along said path of travel; and duct means for supplying treating from the top of the shank to said body having discharge openings located at the rear of the heel at the level thereof and directed toward the sides substantially perpendicularly to said vertical longitudinal plane for discharging said treating fluid into said fissure.

8. An injector blade for injecting treating fluid into soil beneath the surface thereof comprising: a supporting shank disposed in a vertical plane and adapted to penetrate said surface; a pointed tip at the lower end thereof; a heel in rear of said tip having ambilateral projections extending beyond the sides of the shank above the level of said point and adapted to form lateral fissures in the soil entirely beneath said surface when the shank is moved through the soil, said heel having rearwardly converging sides; an open-ended transverse bore in said heel intersecting said rearwardly converging sides to form discharge openings for discharging fluid ambilaterally into said fissures; and duct means for supplying treating fluid to said transverse bore.

9. An injector for injecting a treating fluid into soil beneath the surface thereof comprising: a thin supporting shank disposed in a vertical plane and adapted to penetrate said soil and to be moved through the soil; an enlarged body at the lower end of said shank adapted for generally horizontal movement beneath said surface having a forward tip and a heel in rear of the tip, said tip having a point at the front thereof and widening gradually toward the rear, the upper surface of said tip having a central ridge inclined upwardly from said point to the rear and the parts of said upper surface on each side of said ridge being sloped downwardly therefrom to the sides, said heel being located above the level of said point and having two projections extending laterally beyond the opposite sides of the shank, said projections having upper surfaces that slope upwardly from front to rear starting at levels below the highest part of said ridge to raise the soil and thereby form lateral fissures in the soil entirely beneath said surface when said shank is moved through the soil; duct means for supplying treating fluid from the top of the shank to said body; and discharge openings for said duct means located near the rear of said projections at levels above said point and beneath said upper surfaces of the projections, said openings being directed laterally to discharge said fluid ambilaterally into said fissures.

10. An injector for injecting a treating fluid into soil beneath the surface thereof comprising: a thin supporting shank disposed in a vertical plane and adapted to penetrate said soil and to be moved through the soil; an enlarged body at the lower end of said shank adapted for generally horizontal movement beneath said surface having a forward tip and a heel in rear of the tip, said tip having a point at the front thereof and sides that widen gradually toward the rear to a width exceeding that of the shank, said tip having upper and lower surfaces of which the former is inclined upwardly from the point toward the rear and the latter has a central ridge extending from the point to the rear and diverging upwardly from said lower surface, the parts of the upper surface on each side of said ridge being sloped downwardly to the sides, said heel having two projections extending laterally beyond the opposite sides of the shank and said sides of the tip, said projections having upper and lower surfaces that diverge from front to rear, said upper surfaces of the projections being inclined upwardly from front to rear starting at levels below the highest part of said ridge and said lower surfaces of the projections being substantially at the level of the rear part of said lower surface of the tip and above the level of said point, whereby said projections are adapted to raise soil and to form lateral fissures in the soil entirely beneath said surface when said shank is moved through the soil; duct means for supplying treating fluid from the top of the shank to said body; and discharge openings for said duct means located near the rear of said projections at levels between the upper and lower surfaces of the projections, said openings being directed to the sides substantially perpendicularly to the longitudinal axis of the body for discharging fluid ambilaterally into said fissures.

LESTER S. HANNIBAL.

REFERENCES CITED

The following references are of record in the file of this patent:

UNITED STATES PATENTS

| Number | Name | Date |
| --- | --- | --- |
| 144,487 | Turner et al. | Nov. 11, 1873 |
| 261,558 | Lambert | July 25, 1882 |
| 1,002,344 | Watson | Sept. 5, 1911 |
| 1,004,238 | Brooks | Sept. 26, 1911 |
| 1,038,084 | Carroll | Sept. 10, 1912 |
| 1,287,930 | Evans | Dec. 17, 1918 |
| 1,661,305 | Roberts et al. | Mar. 6, 1928 |
| 2,008,891 | Woods | July 23, 1935 |
| 2,285,932 | Leavitt | June 9, 1942 |
| 2,306,339 | Leavitt | Dec. 22, 1942 |
| 2,322,256 | Rubens | June 22, 1943 |
| 2,415,251 | Leavitt | Feb. 4, 1947 |
| 2,424,520 | Tonkin | July 22, 1947 |

FOREIGN PATENTS

| Number | Country | Date |
| --- | --- | --- |
| 36,551 | France (Addition to 661,045) | Mar. 18, 1930 |
| 144,504 | France | Aug. 12, 1881 |
| 144,505 | France | Aug. 12, 1881 |
| 161,192 | France | Mar. 26, 1884 |